US012789573B2

(12) United States Patent
Brammer et al.

(10) Patent No.: US 12,789,573 B2
(45) Date of Patent: Nov. 10, 2026

(54) ELECTRONIC CONTROL UNIT FOR A LEVEL CONTROL DEVICE OF A VEHICLE, AND METHOD FOR ASCERTAINING THE AXLE LOAD USING SUCH A CONTROL UNIT

(71) Applicant: ZF CV Systems Europe BV, Brussels (BE)

(72) Inventors: Christian Brammer, Bergen (DE); Johann Lucas, Sehnde (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 19/326,427

(22) Filed: Sep. 11, 2025

(65) Prior Publication Data

US 2026/0008313 A1 Jan. 8, 2026

Related U.S. Application Data

(63) Continuation of application No. PCT/EP2024/053539, filed on Feb. 13, 2024.

(30) Foreign Application Priority Data

Mar. 20, 2023 (DE) ..................... 10 2023 106 891.1

(51) Int. Cl.
*B60G 11/14* (2006.01)
*B60G 11/27* (2006.01)
(Continued)

(52) U.S. Cl.
CPC ....... *B60G 17/0152* (2013.01); *B60G 17/019* (2013.01); *B60G 2400/60* (2013.01);
(Continued)

(58) Field of Classification Search
CPC ......... B60G 11/14; B60G 11/27; B60G 11/56; B60G 17/015; B60G 17/0152;
(Continued)

(56) References Cited

U.S. PATENT DOCUMENTS

2012/0123646 A1* 5/2012 Mantini ................ B62D 61/12 73/488
2018/0111438 A1 4/2018 Brehmer et al.
(Continued)

FOREIGN PATENT DOCUMENTS

DE 44 39 064 A1 5/1996
DE 10 2007 048 569 A1 4/2009
(Continued)

OTHER PUBLICATIONS

International Search Report of the European Patent Office dated May 28, 2024 for international application PCT/EP2024/053539 on which this application is based.
(Continued)

*Primary Examiner* — Daniel M. Keck
(74) *Attorney, Agent, or Firm* — Walter Ottesen, P.A.

(57) ABSTRACT

A control unit for a level control device of a mechanically and/or pneumatically/hydraulically suspended vehicle includes a control device configured to control the level and a sensor device installed in the vehicle being functionally expanded such that in addition to the level control or in lieu of the level control, functions can be added for ascertaining the load on mechanically suspended axles and on pneumatically/hydraulically suspended axles. An interface is configured to receive signals from sensors suitable at least for ascertaining the load on mechanically suspended axles. The control unit has a first storage for sensor-specific characteristic curves and a second storage for an algorithm for processing or reprocessing the signals forwarded or pro-
(Continued)

cessed using the interface. For each stored sensor type, the current load on the mechanically suspended axle in question can be ascertained by correlating the signal with the characteristic curve for the sensor type.

14 Claims, 2 Drawing Sheets

(51) Int. Cl.

| | |
|---|---|
| ***B60G 11/56*** | (2006.01) |
| ***B60G 17/015*** | (2006.01) |
| ***B60G 17/019*** | (2006.01) |
| ***B60G 17/052*** | (2006.01) |
| ***G01G 19/10*** | (2006.01) |

(52) U.S. Cl.
CPC .... *B60G 2600/181* (2013.01); *B60G 2800/87* (2013.01); *B60G 2800/912* (2013.01)

(58) Field of Classification Search
CPC .............. B60G 17/0155; B60G 17/019; B60G 17/052; B60G 2202/12; B60G 2202/152; B60G 2400/252; B60G 2400/51222; B60G 2400/60; B60G 2500/20; B60G 2500/30; B60G 2600/181; B60G 2800/87; B60G 2800/912; B60G 2800/914; G01G 19/10
USPC ........................................................ 280/5.514
See application file for complete search history.

(56) References Cited

U.S. PATENT DOCUMENTS

| | | | | |
|---|---|---|---|---|
| 2020/0406700 | A1 | 12/2020 | Jovers et al. | |
| 2022/0234409 | A1 * | 7/2022 | Lucas | B60G 17/0182 |
| 2022/0288991 | A1 | 9/2022 | Lucas et al. | |
| 2024/0034116 | A1 * | 2/2024 | Coombs | B60G 17/0152 |

FOREIGN PATENT DOCUMENTS

| | | | |
|---|---|---|---|
| DE | 10 2015 002 167 | A1 | 8/2016 |
| DE | 10 2016 004 721 | A1 | 2/2017 |
| DE | 10 2017 011 753 | A1 | 6/2019 |
| DE | 10 2019 111 187 | A1 | 11/2020 |
| EP | 2 097 278 | B1 | 12/2015 |

OTHER PUBLICATIONS

English translation and Written Opinion of the International Searching Authority dated May 28, 2024 for international application PCT/EP2024/053539 on which this application is based.

WABCO GmbH, "ECAS in the towing vehicle System description and installation instructions", 2nd Edition, publication copyright WABCO 2007, pp. 1 to 113.

* cited by examiner

ELECTRONIC CONTROL UNIT FOR A LEVEL CONTROL DEVICE OF A VEHICLE, AND METHOD FOR ASCERTAINING THE AXLE LOAD USING SUCH A CONTROL UNIT

CROSS-REFERENCE TO RELATED APPLICATIONS

This application is a continuation application of international patent application PCT/EP2024/053539, filed Feb. 13, 2024, designating the United States and claiming priority from German application 10 2023 106 891.1, filed Mar. 20, 2023, and the entire content of both applications is incorporated herein by reference.

TECHNICAL FIELD

The disclosure relates to an electronic control unit of an electronically controlled level control apparatus of a mechanically and/or pneumatically/hydraulically suspended vehicle, including control means and sensor means that are provided for level control and that are installed and/or functionally extended in the vehicle in such a way that, in addition to level control or instead of level control, functions for determining the axle load on mechanically suspended vehicle axles and for determining the axle load on pneumatically/hydraulically suspended vehicle axles are available. The disclosure also relates to a method for determining an axle load using such a control unit on a mechanically and/or pneumatically/hydraulically suspended vehicle, to an appropriately configured level control apparatus and to a vehicle including such apparatuses.

BACKGROUND

The determination of the axle load on a vehicle is used for indicating and monitoring the loading state thereof. This is intended to avoid overloading, which compromises safety, and disadvantageous weight distributions in the vehicle. In particular in commercial vehicles, the installation of overload indicators is already mandatory or will be so in the future. Weighing of the vehicle on an external weighing station will therefore no longer be sufficient in the future to fulfill legal provisions. There is therefore an increasing need for simple and cost-effective weighing systems on the vehicle side, that is, installed in the vehicle.

What are known as on-board weighing systems, such as, for example, the product Air-Weigh™, which is able to be installed in vehicles with steel suspension, with air suspension or with mixed suspension, are already known. A disadvantage of this is that such devices are relatively costly, separate installation systems, with which a commercial vehicle may be equipped, but which are configured exclusively for determining the axle load, and in particular are not able to be integrated into an existing level control apparatus. Two separate systems are then required for level control and axle load determination.

By way of example, a known system for level control is the modular ECAS (electronically controlled air suspension) system, which is described in the company publication of WABCO GmbH “ECAS im Motorwagen”, 2nd edition, 2007, and has long been used in commercial vehicles such as trucks, buses and trailer vehicles or also in passenger cars. This system already has extended functions, with the aid of which the axle load, at least on air-suspended axles, is also able to be determined.

Such an electronically controlled air suspension system for level control in vehicles includes a plurality of adjustable air spring elements in the form of supporting bellows, an electronic control unit, which may be incorporated into a data bus system (CAN), a travel measuring apparatus for capturing travel variables for level determination, a control valve apparatus for actuating the air spring elements, and an operating unit for the user. In the case of commercial vehicles such as trucks and buses, this air suspension system permits level control for easier loading or unloading of a vehicle. In particular in the case of trailer vehicles, it is possible to achieve a constant body height and improved tire freewheeling under any load. Moreover, what are known as existing lifting axles are able to be raised or lowered as required.

Systems such as the ECAS mentioned may have one or more pressure sensors, which are assigned to the air spring elements and the pressure measured values of which may be used to determine the axle load on air-suspended axles. A method for determining the axle load of a vehicle by measuring pressures in axle-side air spring bellows is described, for example, in DE 44 39 064 B4.

Height sensors, which are also frequently referred to as travel sensors on account of their measurement principle, are generally used on mechanically suspended vehicle axles for determining the axle load. In this case, the axle load determination is based on the measurement of a spring travel of a spring element, via which a vehicle axle or individual vehicle wheels is/are resiliently coupled to a vehicle body. In this case, the travel sensor is generally located on the vehicle body in the vicinity of the vehicle axle, the axle load of which is intended to be measured. In the case of a frequently used type of sensor, the travel sensor is connected to the relevant axle by way of a lever, wherein a rotational movement of the lever is able to be captured via the travel sensor in the form of a rotational angle sensor and an axle load is able to be inferred therefrom. Such a measuring apparatus for measuring an axle load on a vehicle is described, for example, in DE 10 2016 004 721 A1.

US 2020/0406700 discloses a method for the vehicle-side determination of an axle load on a mechanically and/or pneumatically/hydraulically suspended vehicle. The axle load is determined with the aid of control means and sensor means that are provided for an electronically controlled, pneumatic/hydraulic level control system, for example ECAS, and are optionally functionally extended. A plausibility check is first of all carried out, on the basis of which plausibility check the level control system identifies the respective suspension type (mechanical or pneumatic/hydraulic) of a vehicle axle. The corresponding function for determining the axle load is then activated. In the known method, the axle load is determined on a mechanically suspended vehicle axle via a travel measuring apparatus. The axle load is determined on a pneumatically/hydraulically suspended vehicle axle via a pressure measuring apparatus.

It is not entirely optimal that only measurement signals from travel sensors are provided for determining the axle load on mechanically suspended vehicle axles. Accordingly, this known method is not configured for determining the axle load on mechanically suspended axles using sensors, the measurement principle of which is not based on a measurement of the spring deflection of the vehicle body. In addition, although overloading of the vehicle is able to be reliably identified with the aid of a travel sensor, a load indication over the entire load range, in particular in the low load range, if the vehicle is only slightly loaded, is rather inaccurate.

SUMMARY

It is an object of the disclosure to provide an electronic control unit, using which, on the one hand, at least axle load determination is able to be carried out on mechanically suspended vehicles, and, on the other hand, axle load determination is able to be carried out on pneumatically/hydraulically suspended vehicles or on vehicles with mixed suspension with the possibility of level control. In this case, the control unit is intended to have an extended functionality with regard to capturing a sensor signal for determining the axle load on the mechanically suspended vehicle axles. A further object was to present a method for determining the axle load using such a control unit. In particular, this control unit and this method are intended to be suitable for use in a commercial vehicle.

This object is achieved by various embodiments of the disclosure.

The disclosure was based on the finding that an air spring level control system for vehicles, which is already available per se, in principle has all the components that are also required for an axle load measuring system, specifically independently of the type of suspension of the vehicle. Such a system may be adapted and extended with comparatively little outlay in order to be able to be operated largely independently of the type of sensor during the axle load determination. As a result, it is possible to provide a very versatile system for level control and for axle load measurement on pneumatically/hydraulically or mechanically suspended vehicles or vehicles with mixed suspension.

To achieve the device-related object, the disclosure is based on an electronic control unit of an electronically controlled level control apparatus of a mechanically and/or pneumatically/hydraulically suspended vehicle, including control means and sensor means that are provided for level control and that are installed and/or functionally extended in the vehicle in such a way that, in addition to level control or instead of level control, functions for determining the axle load on mechanically suspended vehicle axles and for determining the axle load on pneumatically/hydraulically suspended vehicle axles are available.

According to the disclosure, provision is made here for the control unit to have an electrical interface that is configured to receive electrical measurement signals from sensors of different sensor types that are suitable at least for determining the axle load on mechanically suspended vehicle axles, and for the control unit to have a first non-volatile memory for storing sensor-specific characteristic curves and a second non-volatile memory for storing an algorithm for processing or further processing the sensor-specific measurement signals forwarded or processed by way of the interface, wherein the current axle load on a relevant mechanically suspended vehicle axle is able to be determined for each stored type of sensor via a correlation of the respective sensor-specific measurement signal forwarded or processed by way of the interface with the characteristic curve stored for the respective type of sensor.

The term mechanical suspension used is usually understood to mean steel suspension. In principle, a mechanical suspension may also have springs made of other materials, such as other alloys or fiber composite materials, instead of steel springs. Where steel-suspended axles are mentioned here, this is not intended to imply any limitation of the disclosure to mechanical springs made of this material. Where air-suspended vehicle axles are mentioned, the corresponding comments may be transferred to hydraulically suspended axles. A pneumatic/hydraulic suspension is understood to mean a suspension that may be based either on air springs (pneumatic) or on fluid springs (hydraulic).

As already mentioned at the outset, the term "ECAS" is an abbreviation for an electronically controlled air suspension apparatus.

The disclosure provides an integrated axle load measuring system, which is able to determine the axle load on the axles of a vehicle independently of pneumatic/hydraulic or mechanical suspension, and which is not limited to a specific type of sensor on the mechanical axles. The particular advantage of the disclosure is that the same electronic control unit is able to determine the axle load on a mechanically suspended axle not only via conventional travel sensors, but also via load sensors. As a result, the control unit is, for example, able to evaluate the signal from particularly sensitive and accurately measuring load sensors.

Accordingly, the disclosure proposes storing a computation algorithm in an electronic control unit, which is, for example, present in an ECAS system, of an electronically controlled level control apparatus of a mechanically and/or pneumatically/hydraulically suspended vehicle in a reserved, non-volatile memory area, which computation algorithm is able to calculate the axle load on a mechanically suspended axle from measurement data of a sensor, for example a height sensor or a load sensor, depending on the configuration of the sensor. By way of example, a height sensor and/or a load sensor may therefore be arranged on the relevant axle. As a result, this extended ECAS system is suitable for vehicles with different suspension types and sensor types.

The control unit of an air spring level control system is therefore extended to the extent that, in addition to the already existing functions of level control on the air suspension and of determining the axle load on air-suspended axles and of determining the axle load on mechanically suspended axles using a travel sensor, it is now also possible to determine the axle load on mechanically suspended axles with a load sensor using this control unit.

In order for the computation algorithm to be able to process the corresponding measurement data, an interface is arranged for this purpose that is configured to capture signals from different types of sensor, all of which are suitable for determining the axle load on mechanically suspended axles. This common interface, that is, interface that is independent of the type of sensor, is in particular able to capture both signals from a height sensor and signals from a load sensor and to transmit them to the control unit. Characteristic curves for various possible types of sensor are in each case stored in a non-volatile memory of the control unit. The computation algorithm may then evaluate the sensor signal via the respective sensor-specific characteristic curve in order to determine the axle load.

According to a first embodiment of the disclosure, provision may be made for the interface to be in the form of a pulse width modulation interface. The pulse width modulation (PWM) method is particularly well suited to transmitting analog sensor measured values to an electronic controller and has already proven itself many times over. Accordingly, the electrical sensor measured values of height sensors and/or of load sensors, which are produced on mechanically suspended vehicle axles, may optionally be captured by way of electrical or optical lines or by way of a radio link via the interface, converted into PWM signals and supplied to the computation algorithm for further processing. The particular advantage here is that the PWM signal is relatively insensitive to interfering external influences, such as, for example, line-dependent voltage drops.

According to another embodiment, provision may be made, via the interface, for measurement signals from a sensor that is arranged on a mechanically suspended vehicle axle or is assigned thereto to be able to be captured for determining the axle load, wherein the sensor is based on a measurement principle that operates with contact of the vehicle axle and the vehicle body or on a measurement principle that operates contactlessly between the vehicle axle and the vehicle body.

Accordingly, the electrical interface is largely independent of the type of sensor and is able to interact both with sensors, in the case of which the vehicle body is mechanically coupled to a mechanically suspended vehicle axle and with sensors, in the case of which a transmitting apparatus and a receiving apparatus are arranged on the vehicle body and on a mechanically suspended vehicle axle.

According to another embodiment of the electronic control unit, provision may be made, via the interface, for measurement signals from a sensor that is arranged on or in the region of a mechanically suspended vehicle axle and is in the form of a load sensor to be able to be captured for determining the axle load.

Travel sensors have previously usually been used for determining the axle load on mechanically suspended vehicle axles, with the spring deflection of the vehicle being converted to an axle load. This type of axle load determination is suitable for determining when the maximum permissible axle load of the vehicle has been reached or exceeded, and has proven successful. In the case of partial loading, however, the determination of the axle load is relatively inaccurate on account of the level of the spring deflection. Load sensors are better suited for reliably and accurately determining the axle load and the total weight of the vehicle in the entire range from unloaded to fully loaded. According to the disclosure, the interface is suitable for receiving measurement signals from such sensors.

By way of example, known strain gauge load sensors are taken into consideration for determining the axle load on mechanically suspended vehicle axles. These are based on a measurement of a change in electrical resistance on account of a load-dependent deformation of a component. Magnetic field load sensors are already in development. By way of example, such future load sensors may use effects that are based on a load-dependent change in the magnetic properties of a ferromagnetic component, as described, for example, in DE 10 2007 048 569 B4. Corresponding characteristic curves of such types of sensor may already be stored, or may be stored in the future with little outlay, in the control unit.

Provision may furthermore be made, via the interface, for measurement signals from a sensor that is arranged on or in the region of a mechanically suspended vehicle axle and is in the form of a travel sensor to be able to be captured for determining the axle load.

It goes without saying that it is furthermore also possible to use conventional travel sensors to determine the axle load. These may be based on a mechanical coupling of a rotational angle sensor between the vehicle body and the vehicle axle, wherein a measured distance between the vehicle body and the vehicle axle is converted to an axle load value via a level signal characteristic curve. It is also possible to use travel sensors that operate contactlessly, that is, without mechanical coupling between the vehicle axle and the chassis, which operate with an electromagnetic transmitting/receiving apparatus, as described, for example, in US 2018/0111438.

To achieve the method-related object, the disclosure is based on a method for determining an axle load on a mechanically and/or pneumatically/hydraulically suspended vehicle, in which the axle load is determined with the aid of an electronic control unit of an electronically controlled level control apparatus of the vehicle, wherein control means and sensor means that are provided for level control are installed and/or functionally extended in the vehicle in such a way that, in addition to level control or instead of level control, functions for determining the axle load on mechanically suspended vehicle axles and for determining the axle load on pneumatically/hydraulically suspended vehicle axles are available.

According to the disclosure, this method makes provision, in order to determine the axle load on a mechanically suspended vehicle axle by way of an electrical interface of the control unit that is configured to receive electrical measurement signals from sensors of different sensor types that are suitable at least for determining the axle load on mechanically suspended vehicle axles, for a measurement signal from such a sensor to be captured and evaluated via an algorithm stored in the control unit. In this case, the type of sensor provided for determining the axle load on the mechanically suspended vehicle axle is first of all preselected or determined, and a characteristic curve stored in a memory of the control unit for this identified type of sensor is then selected. With the aid of this characteristic curve, an axle load is assigned to the respective measured value of the captured measurement signal and a corresponding axle load-dependent signal is output.

Accordingly, an existing control unit of a level control apparatus such as ECAS may advantageously also be used for vehicle applications in which the vehicle does not have air springs, that is, also does not have any supporting bellows, control valves or pressure sensors, or in which the vehicle has not only air-suspended axles with these components but also mechanically suspended axles without these components. The control unit is modified in terms of software and expanded with an electrical interface that is independent of the type of sensor in such a way that the axle load may also be determined on these mechanically suspended axles by virtue of the control unit capturing measured values from sensors installed on the mechanically suspended axles and converting them to axle load values with the aid of a characteristic curve. Suitable sensors may be travel sensors or load sensors. For this purpose, the type of sensor present on the mechanically suspended vehicle axles of the vehicle is preselected in the control unit and calibrated if required.

The method may advantageously be applied both to mechanically suspended vehicles and to vehicles with mixed suspension. In order to avoid malfunctions, in the case of vehicles with mixed suspension, the axle load determination on the mechanically suspended vehicle axles may be preceded by a plausibility check in order to distinguish mechanically suspended axles from pneumatically suspended axles. For this purpose, it is possible, for example, to verify the presence of supporting bellows, pressure sensors and valve apparatuses assigned thereto on existing air-suspended vehicle axles.

It is advantageous if the method is carried out repeatedly at specific time intervals or if at least the respective sensor signals are captured repeatedly over a predetermined period of time and temporally averaged output signals are formed therefrom. The accuracy and the reliability of the determined axle load values are able to be increased as a result. At the least, the method should be carried out after each time that the control unit of the level control apparatus is switched on again. This ensures satisfactory operational readiness of the system.

Furthermore, the disclosure also relates to a level control apparatus of a vehicle, which is constructed for level control and for determining the axle load on mechanically and/or pneumatically/hydraulically suspended vehicle axles, and is able to be operated to carry out a method. Finally, the disclosure relates to a vehicle, such as a commercial vehicle or a passenger car, including a level control apparatus for level control and for determining the axle load on mechanically and/or pneumatically/hydraulically suspended vehicle axles.

BRIEF DESCRIPTION OF DRAWINGS

The invention will now be described with reference to the drawings wherein.

DETAILED DESCRIPTION

Figure 1:
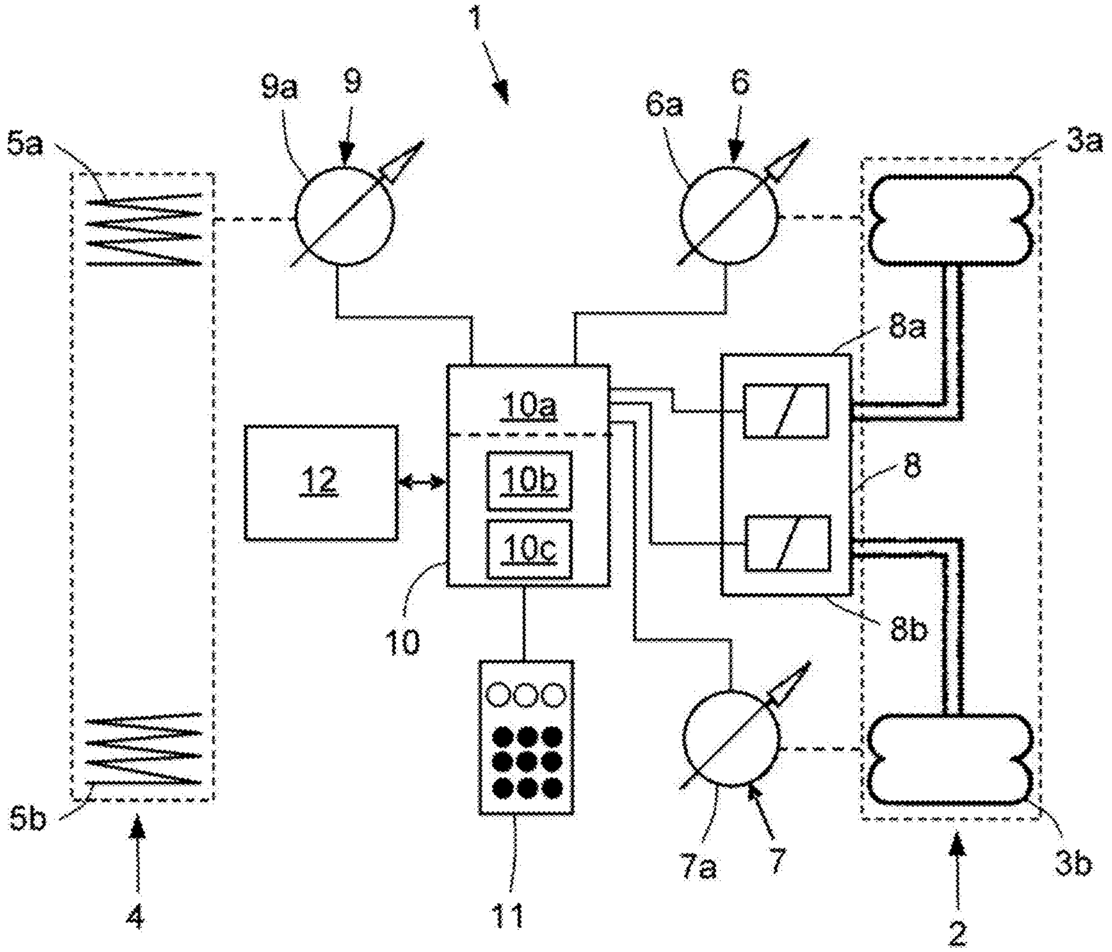
FIG. 1 shows a level control apparatus, which is shown in a highly schematically simplified manner, and which is configured for determining the axle load, and for level control, on a vehicle equipped with mechanically and pneumatic suspended axles; and, FIG. 2 shows a flowchart of an embodiment of a method according to the disclosure for determining an axle load on a vehicle with mixed suspension according to FIG. 1.

The level control apparatus 1, which is shown in a simplified manner in FIG. 1, of a vehicle, for example an ECAS system, for example of a truck, has two adjustable air spring elements 3*a,* 3*b,* which are in the form of supporting bellows, for a resilient support of a vehicle body, which is not shown, with respect to a rear vehicle axle 2 in the form of a drive axle. In contrast, a front vehicle axle 4 is supported, that is, mechanically suspended, with respect to the vehicle body by way of two steel spring elements 5*a,* 5*b* in the form of helical compression springs.

A travel measuring apparatus 6 including a travel sensor 6*a* for capturing travel variables for level control, a pressure measuring apparatus 7 including at least one pressure sensor 7*a* for capturing pressure values for determining the axle load on the air-suspended vehicle axle 2, and a control valve apparatus 8, which is in the form of a valve circuit, including in each case one control valve 8*a,* 8*b,* which is in the form of a solenoid valve, for each air spring element 3*a,* 3*b* are assigned to the pneumatically/hydraulically suspended, in this case air-suspended, rear vehicle axle 2. The control valve apparatus 8 is switchably pneumatically connected to the air spring elements 3*a,* 3*b* and has a compressed-air connection, which is not designated in any more detail. An axle load measuring apparatus 9 including an axle load sensor 9*a* for determining the axle load on this axle 4 is assigned to the mechanically suspended, in this case steel-suspended, front vehicle axle 4.

Furthermore, an electronic control unit 10 is arranged between the vehicle body and the air-suspended vehicle axle 2 to evaluate the travel, axle load and pressure measured values and to control the air spring elements 3*a,* 3*b* to adjust a driving level. The electronic control unit 10 has an electrical interface 10*a,* which is configured to receive and transmit measurement signals from different types of sensor. The interface 10*a* is in particular able to capture and to further process measurement signals from different types of sensor, which may be arranged on the mechanically suspended vehicle axle 4 depending on the equipment of the vehicle. For this purpose, pulse width modulation of the received measurement signals may be carried out via the interface 10*a,* whereupon the modulated measurement values are supplied to the control unit 10. Furthermore, the electronic control unit 10 has a non-volatile memory 10*b,* in which a plurality of characteristic curves of different types of sensor are stored, for example in tables or value pairs.

Moreover, an operating unit 11 for a respective user is electrically connected to the control unit 10. The user is able to trigger or perform adjustments and a calibration of the level control apparatus 1 via the operating unit 11, for example as described in EP 2 097 278 B1. The control valve apparatus 8, the travel measuring apparatus 6 and the pressure measuring apparatus 7 assigned to the air-suspended axle 2, and the axle load measuring apparatus 9 assigned to the mechanically suspended axle are connected to the control unit 10 for signal transfer purposes. The control unit 10 has a CAN controller, by way of which the control unit 10 is connected to a CAN bus 12. The CAN controller controls interrupt requests and regulates the data transfer. The construction of a CAN bus in a vehicle and the connection of various bus subscribers to the CAN bus are known.

The travel sensor 6*a* for level control is fastened to the vehicle body in the vicinity of its assigned air-suspended vehicle axle 2 and is connected to the vehicle axle 2 by way of a lever system, which is not shown. The travel sensor 6*a* has a rotational angle sensor, which is not shown, and which captures the respective angular position of the lever system mentioned. The rotational movement of the lever system may be converted to a linear movement inside the travel sensor 6*a,* for example in the form of the plunging of an armature into a coil, wherein, during the plunging movement of the ferromagnetic armature into the stationary coil, a travel-dependent phase shift between the current and the voltage occurs, which is made available as an output signal that the control unit 10 receives. An actual level of the distance between the vehicle axle 2, 4 and the vehicle body is able to be determined from this signal. The value of the actual level may be used for level control on the air-suspended vehicle axle 2.

Level control of an air suspension using such a system is known per se. The travel sensor 6*a* for level control captures the distance between the vehicle axle and the vehicle body at specific time intervals. The measured value determined is the actual value of a control loop and is forwarded to the control unit 10. In the control unit 10, this actual value is compared with a target value stipulated in the control unit 10. In the case of an impermissible difference between the actual value and the target value, an actuating signal is transmitted from the control unit 10 to the control valve 8*a,* 8*b*. Depending on this actuating signal, the control valve 8*a,* 8*b* now actuates the air spring element 3*a,* 3*b,* which is in the form of a bellows, and supplies the air spring element with air or relieves the air spring element of air. As a result of the change in pressure in the air spring element 3*a,* 3*b,* the distance between the vehicle axle and the vehicle body also changes. The distance is captured again by the travel sensor 6*a* and the cycle starts over.

The axle load sensor 9*a* for determining the axle load on the mechanically suspended vehicle axle 4 is fastened to the vehicle body in the vicinity of its assigned vehicle axle 4. By way of example, the axle load sensor 9*a* may be in the form of a travel sensor, which is configured substantially structurally identically to the travel sensor 6*a* for level control. In the case of such an axle load sensor 9*a*, the value of the actual level is used to determine the axle load on the mechanically suspended vehicle axle 4. The determination of the axle load on the mechanically suspended vehicle axle 4 takes advantage of the simple relationship that the force that bears on the vehicle axle 4 is determined from the spring constant of the spring element 5*a*, 5*b* and the measured spring deflection, as a result of which the axle load of the vehicle is able to be determined via a level signal characteristic curve. This embodiment of an axle load sensor 9*a* should be considered purely by way of example. Alternatively, axle load sensors 9*a* that directly produce a load-dependent signal instead of a travel-dependent signal are taken into consideration. Such axle load sensors 9*a* are already known and constantly undergo further development.

According to the disclosure, the interface 10*a* of the control unit 10 is in any case configured in such a way that, as a common interface, it is able to process both signals from travel sensors and signals from load sensors that are produced on mechanically suspended vehicle axles. Only one algorithm is required, which, with the aid of a stored sensor-specific characteristic curve, converts the measurement signal from the sensor identified by the control unit 10 to an axle load value.

Furthermore, the control unit 10 may additionally receive signals from the pressure measuring apparatus 7 by way of the interface 10*a* in order to determine the axle load on the air-suspended vehicle axle 2. The determination of the axle load takes advantage of the relationship that the force that bears on the vehicle axle 4 is able to be inferred from a pressure value in the air spring element 3*a*, 3*b*, as a result of which an axle load value of the vehicle is able to be determined via a pressure signal characteristic curve.

Figure 2:
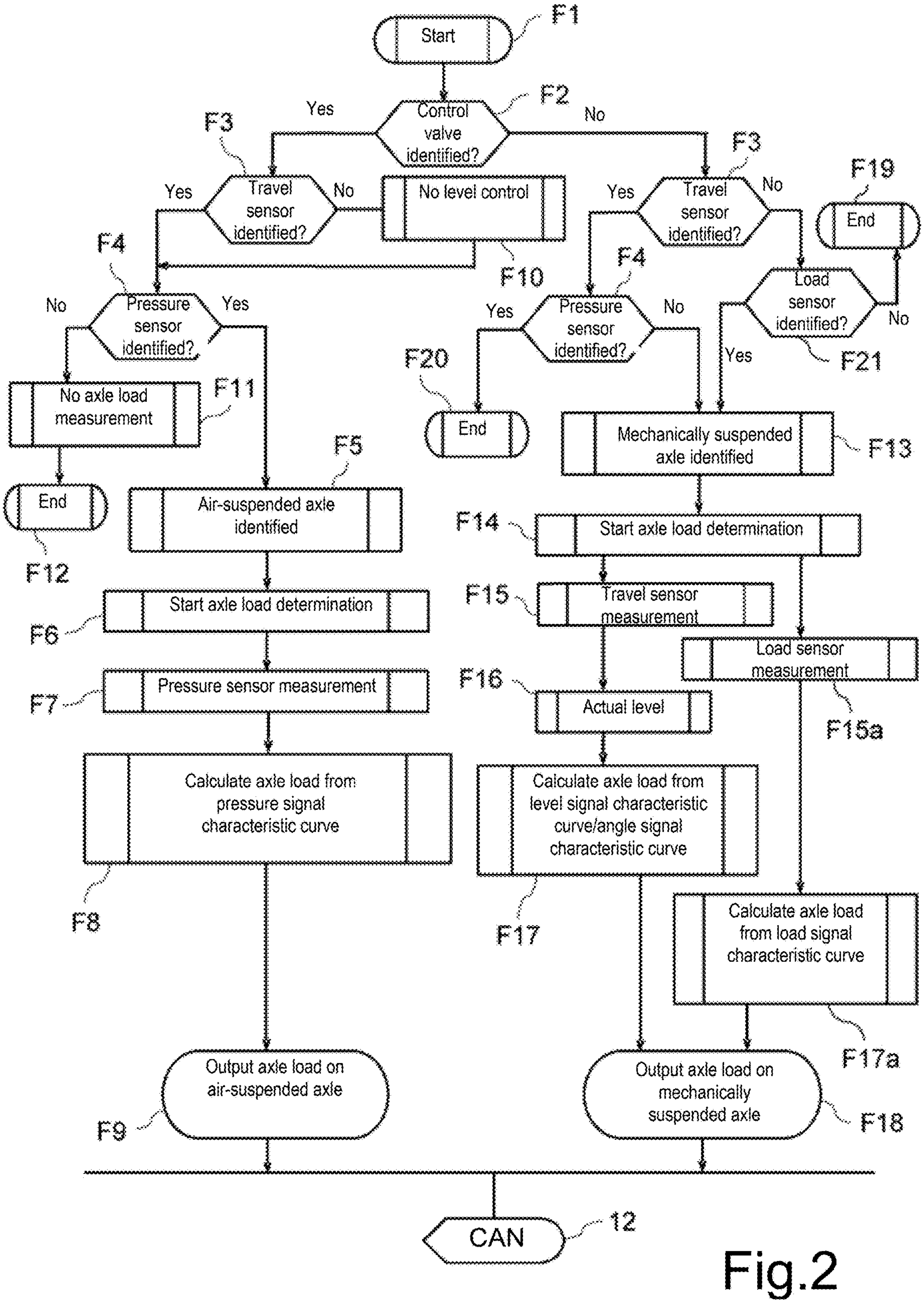

Level control of an air suspension using such a system is not relevant per se to the disclosure and need not be described in detail here. The following embodiment is therefore restricted to the sequence of a method according to the disclosure for determining an axle load on the mechanically suspended vehicle axle 4, on the one hand, and on the air-suspended vehicle axle 2, on the other hand. FIG. 2 is used to explain this method. Accordingly, FIG. 2 shows a flowchart with function blocks F1 to F21 of method steps for determining an axle load on the air-suspended vehicle axle 2 and on the mechanically suspended vehicle axle 4.

The method starts with the activation of the level control apparatus 1, for example when an ignition system of the vehicle is switched on, according to a first function block F1. An axle-specific plausibility check is first of all carried out with three component queries, on the basis of which the program is divided into two program branches. These are a first routine, which determines the axle load on the air-suspended vehicle axle 2, and a second routine, which determines the axle load on the mechanically suspended vehicle axle 4. An axle-specific plausibility check for identifying the type of suspension and a first routine for determining the axle load on an air-suspended vehicle axle are already described per se in DE 10 2017 011 753.5, corresponding to US 2020/0406700, mentioned at the outset, by the applicant. In contrast to this, an adapted plausibility check and a new second routine, which determines the axle load on the mechanically suspended vehicle axle 4, are presented here according to the disclosure.

Accordingly, the plausibility check starts with a first query F2 as to whether a signal of a control valve 8*a*, 8*b* that is not equal to zero is present in a predetermined period of time. There follows a second query F3 as to whether a signal of a travel sensor 6*a* that is not equal to zero is present in a predetermined period of time. There is then a third query F4 as to whether a signal of a pressure sensor 7*a* that is not equal to zero is present in a predetermined period of time. These queries are carried out in the same way on each vehicle axle 2, 4 or the associated components thereof.

If a control valve signal, a travel sensor signal and a pressure sensor signal are present, the air-suspended vehicle axle 2 is identified in block F5 and the associated routine for determining the axle load starts in block F6. In block F7, the pressure sensor signal is read out. In block F8, the axle load on the air-suspended vehicle axle 2 is determined via a pressure signal characteristic curve stored in a memory 10*b* of the control unit 10 and, in block F9, is transmitted on the CAN bus 12.

The axle load information of the air-suspended vehicle axle 2 may be displayed to the driver via a display and/or used by other electronic control systems. If no travel sensor signal is identified, although a control valve signal is present, no level control is possible on the air-suspended vehicle axle 2 according to block F10.

If no pressure sensor signal is registered, although a control valve signal and a travel sensor signal are present, no axle load measurement may take place on the air-suspended vehicle axle 2 according to block F11, and the routine on the air-suspended vehicle axle 2 ends in block F12.

If no control valve signal is present in block F2, but a travel sensor signal is present in block F3 and, however, no pressure sensor signal is present in block F4, the mechanically suspended vehicle axle 4 is identified in block F13 and the associated routine for determining the axle load starts in block F14. In block F15, the travel sensor signal or the rotational angle sensor signal is read out. In block F16, the actual level is determined therefrom. In block F17, the axle load on the mechanically suspended vehicle axle 4 is determined via a level signal characteristic curve, which is stored in the memory 10*b* of the control unit 10 and in which the measured actual level is correlated with the axle load, or via an angle signal characteristic curve, in which the measured rotational angle of the rotational angle sensor is correlated with the axle load, and, in block F18, is transmitted on the CAN bus 12.

If no control valve signal is present in block F2 and no travel sensor signal is present in block F3, according to the disclosure, a further query is carried out in block F21 as to whether a signal of a load sensor is present in a predetermined period of time. If this is the case, the mechanically suspended vehicle axle 4 is identified in block F13 and the associated routine for determining the axle load starts in block F14. In block F15*a*, the load sensor signal is read out. In block F17*a*, the axle load on the mechanically suspended vehicle axle 4 is determined via a load signal characteristic curve, which is stored in the memory 10*b* of the control unit 10 and in which the measured load signal is correlated with the axle load, and, in block F18, is transmitted on the CAN bus 12.

The axle load information relating to the mechanically suspended vehicle axle 4 may be displayed to the driver again by way of a display and/or used by other electronic control systems. The axle load information is therefore available at all of the vehicle axles 2, 4.

If neither a control valve signal, nor a travel sensor signal, nor a load sensor signal are identified, the routine ends in block F19. If, when a travel sensor signal is present, a pressure sensor signal is also registered, although no control valve signal is present, there is an error and the routine ends in block F20.

The routines of the method may be carried out on any number of vehicle axles for mechanically, pneumatically/hydraulically suspended vehicles or vehicles with mixed suspension.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 Level control apparatus
2 Pneumatically/hydraulically suspended vehicle axle
3*a* First air spring element
3*b* Second air spring element
4 Mechanically suspended vehicle axle
5*a* First steel spring element
5*b* Second steel spring element
6 Travel measuring apparatus
6*a* Sensor, travel sensor of the travel measuring apparatus
7 Pressure measuring apparatus
7*a* Sensor, pressure sensor of the pressure measuring apparatus
8 Control valve apparatus, valve circuit
8*a* First control valve of the valve circuit
8*b* Second control valve of the valve circuit
9 Axle load measuring apparatus
9*a* Sensor, axle load sensor of the axle load measuring apparatus
10 Electronic control unit
10*a* Electrical interface of the control unit
10*b* First non-volatile memory of the control unit
10*c* Second non-volatile memory of the control unit
11 Operating unit of the control unit
12 CAN bus
F1-F21 Function blocks of a control method

The invention claimed is:

1. An electronic control unit of an electronically controlled level control apparatus of a vehicle, the vehicle being at least one of a mechanically suspended vehicle and a pneumatically or hydraulically suspended vehicle, the electronically controlled level control apparatus including a control device and a sensor device that are provided for level control and that are at least one of installed and functionally extended in the vehicle such that functions for determining an axle load on mechanically suspended vehicle axles and for determining the axle load on pneumatically or hydraulically suspended vehicle axles are available both while the level control is being performed and while the level control is not being performed, the electronic control unit comprising:

an electrical interface configured to receive electrical measurement signals from sensors of different sensor types that are suitable at least for determining the axle load on the mechanically suspended vehicle axles;

a first non-volatile memory for storing sensor-specific characteristic curves;

a second non-volatile memory for storing an algorithm for processing or further processing sensor-specific measurement signals forwarded or processed by way of the electrical interface;

wherein an axle load on a mechanically suspended vehicle axle is determinable for each stored type of sensor via a correlation of the respective sensor-specific measurement signal forwarded or processed by way of said electrical interface with one of the stored sensor-specific characteristic curves stored for the respective type of sensor, wherein the control device comprises the electronic control unit, and wherein the sensor device comprises the sensors.

2. The electronic control unit of claim 1, wherein said electrical interface is a pulse width modulation interface.

3. The electronic control unit of claim 1, wherein, via said electrical interface, measurement signals from a sensor arranged on the mechanically suspended vehicle axle or assigned to the mechanically suspended vehicle axle are capturable for determining the axle load; and, the sensor is based on a measurement principle that requires contact of the sensor with the mechanically suspended vehicle axle and a vehicle body of the vehicle.

4. The electronic control unit of claim 3, wherein, via said electrical interface, the measurement signals from the sensor arranged on or assigned to the mechanically suspended vehicle axle are capturable for determining the axle load; and, the sensor is a load sensor.

5. The electronic control unit of claim 3, wherein, via said electrical interface, the measurement signals from the sensor arranged on or assigned to the mechanically suspended vehicle axle are capturable for determining the axle load; and, the sensor is a travel sensor.

6. The electronic control unit of claim 1, wherein, via said electrical interface, measurement signals from a sensor assigned to the mechanically suspended vehicle axle are capturable for determining the axle load; and, the sensor is based on a measurement principle that operates contactlessly between the vehicle axle and a vehicle body of the vehicle.

7. The electronic control unit of claim 6, wherein, via said electrical interface, the measurement signals from of the sensor assigned to the mechanically suspended vehicle axle are capturable for determining the axle load; and, the sensor is a load sensor.

8. The electronic control unit of claim 6, wherein, via said electrical interface, the measurement signals from the sensor arranged on or in the region of the sensor assigned to the mechanically suspended vehicle axle are capturable for determining the axle load; and, the sensor is a travel sensor.

9. The electronic control unit of claim 1, wherein the sensors of different sensor types comprise a load sensor assigned to the mechanically suspended vehicle axle, and wherein the axle load on the mechanically suspended vehicle axle is determinable from an electrical measurement signal from the load sensor via a correlation of the electrical measurement signal forwarded or processed by way of the electrical interface with one of the stored sensor-specific characteristic curves corresponding to the load sensor.

10. A method for determining an axle load on a vehicle, the vehicle being (A) mechanically suspended and/or (B) pneumatically or hydraulically suspended, wherein the axle load is determined via an electronic control unit of an electronically controlled level control apparatus of the vehicle, wherein a control device and a sensor device provided for level control are at least one of installed and functionally extended in the vehicle such that functions for determining the axle load on mechanically suspended vehicle axles and for determining the axle load on pneumatically or hydraulically suspended vehicle axles are available both while the level control is being performed and while the level control is not being performed, the method comprising:

capturing a measurement signal from a sensor and evaluating the measurement via an algorithm stored in the electronic control unit in order to determine the axle load on a mechanically suspended vehicle axle, by way of an electrical interface of the electronic control unit that is configured to receive electrical measurement signals from sensors of different sensor types that are suitable at least for determining the axle load on mechanically suspended vehicle axles;

preselecting or determining the type of sensor provided for determining the axle load on the mechanically suspended vehicle axle;

selecting a characteristic curve stored in a memory of the electronic control unit for the preselected or determined type of sensor;

assigning the axle load to the respective measured value of the captured measurement signal via the characteristic curve; and, outputting a corresponding signal that is dependent on the axle load, wherein the control device comprises the electronic control unit, and wherein the sensor device comprises the sensors.

11. The method of claim 10 further comprising, in a case of a vehicle with mixed mechanical suspension and either pneumatic or hydraulic suspension, carrying out a plausibility check implemented in the electronic control unit on a basis of which the electronically controlled level control apparatus identifies a respective suspension type of a vehicle axle, and the corresponding function for determining the axle load is then activated.

12. A level control apparatus of a vehicle for level control, the level control apparatus comprising:

an electronic control unit;

the level control apparatus including a control device and a sensor device that are provided for the level control and that are at least one of installed and functionally extended in the vehicle such that functions for determining load an axle load on mechanically suspended vehicle axles and for determining the axle load an axle load on pneumatically or hydraulically suspended vehicle axles are available both while the level control is being performed and while the level control is not being performed;

said electronic control unit including an electrical interface configured to receive electrical measurement signals from sensors of different sensor types that are suitable at least for determining the axle load on mechanically suspended vehicle axles;

said electronic control unit further including a first non-volatile memory for storing sensor-specific characteristic curves and a second non-volatile memory for storing an algorithm for processing or further processing sensor-specific measurement signals forwarded or processed by way of the electrical interface;

wherein an axle load on a mechanically suspended vehicle axle is determinable for each stored type of sensor via a correlation of the respective sensor-specific measurement signal forwarded or processed by way of said electrical interface with one of the stored sensor-specific characteristic curves stored for a respective type of sensor;

said electronic control unit being configured to:

capture the measurement signal from such a sensor and evaluating the measurement signal via an algorithm stored in the electronic control unit in order to determine the axle load on the mechanically suspended vehicle axle, by way of the electrical interface of the electronic control unit that is configured to receive the electrical measurement signals from the sensors of the different sensor types that are suitable at least for determining the axle load on mechanically suspended vehicle axles;

preselect or determine the type of sensor provided for determining the axle load on the mechanically suspended vehicle axle;

select the one of the stored sensor-specific characteristic curves stored in said first non-volatile memory of the electronic control unit for the preselected or determined type of sensor;

assign the axle load to a respective measured value of the captured measurement signal via the one of the stored sensor-specific characteristic curves and, output a corresponding signal that is dependent on the axle load, wherein the control device comprises the electronic control unit, and wherein the sensor device comprises the sensors.

13. A vehicle comprising the level control apparatus of claim 12.

14. The vehicle of claim 13, wherein the vehicle is a commercial vehicle or a passenger car.

* * * * *